(12) United States Patent
Reed et al.

(10) Patent No.: US 7,689,239 B2
(45) Date of Patent: Mar. 30, 2010

(54) SYSTEM, METHOD, AND APPARATUS FOR ESTABLISHING HEADROOM FOR A MOBILE STATION

(75) Inventors: John D. Reed, Arlington, TX (US); Hao Bi, Wheeling, IL (US)

(73) Assignee: Motorola, Inc., Schaumburg, IL (US)

( * ) Notice: Subject to any disclaimer, the term of this patent is extended or adjusted under 35 U.S.C. 154(b) by 961 days.

(21) Appl. No.: 10/663,103

(22) Filed: Sep. 16, 2003

(65) Prior Publication Data
US 2005/0059421 A1    Mar. 17, 2005

(51) Int. Cl.
*H04B 7/00* (2006.01)
(52) U.S. Cl. .................... 455/522; 455/69; 370/318
(58) Field of Classification Search .................. 455/69, 455/522; 370/318
See application file for complete search history.

(56) References Cited

U.S. PATENT DOCUMENTS

| | | | |
|---|---|---|---|
| 5,923,650 A * | 7/1999 | Chen et al. ............... 370/331 |
| 6,157,820 A * | 12/2000 | Sourour et al. ........... 455/226.2 |
| 6,563,810 B1 * | 5/2003 | Corazza .................... 370/335 |
| 6,775,252 B1 * | 8/2004 | Bayley ...................... 370/328 |
| 7,023,822 B1 * | 4/2006 | Czaja et al. ................ 370/332 |
| 7,058,028 B1 * | 6/2006 | Holma et al. .............. 370/318 |
| 2002/0009155 A1 | 1/2002 | Tzannes |
| 2002/0123349 A1 | 9/2002 | Miyoshi et al. |
| 2002/0142791 A1 * | 10/2002 | Chen et al. ................. 455/522 |
| 2003/0002464 A1 * | 1/2003 | Rezaiifar et al. ........... 370/336 |
| 2003/0081627 A1 * | 5/2003 | Bao et al. ................... 370/444 |
| 2003/0124999 A1 * | 7/2003 | Parssinen et al. ......... 455/226.1 |
| 2003/0133409 A1 | 7/2003 | Corazza |
| 2004/0147276 A1 * | 7/2004 | Gholmieh et al. .......... 455/522 |
| 2004/0252658 A1 | 12/2004 | Hosein et al. |
| 2005/0169301 A1 | 8/2005 | Jain et al. |

\* cited by examiner

*Primary Examiner*—Raymond S Dean
*Assistant Examiner*—Edward F Urban
(74) *Attorney, Agent, or Firm*—Sylvia Chen

(57) ABSTRACT

A system, method, and apparatus for establishing headroom for a mobile station operating in a wireless communication system by determining (230) a communication channel variance condition and establishing (245) a headroom value based on the communication channel variance condition. The headroom value may be further revised by determining (260) if a battery condition in a mobile station relates to a low battery level and increasing (265) the headroom value in order to decrease the maximum data rate. Modifications to headroom allow data rates to be tailored to specific channel variance conditions and battery conditions.

15 Claims, 3 Drawing Sheets

SYSTEM, METHOD, AND APPARATUS FOR ESTABLISHING HEADROOM FOR A MOBILE STATION

FIELD OF THE DISCLOSURE

This disclosure relates generally to wireless communications technology, and more particularly to power control of wireless transmissions under varying channel conditions.

BACKGROUND OF THE DISCLOSURE

Electronic communications, especially wireless communications, occur under varying channel conditions. In order to maintain a voice or data connection under unknown and changing channel conditions, many wireless communication system transmitters apply a margin. This margin reserves room for fading and other common adverse channel conditions during communication by ensuring that the quality of communications is not degraded below an accepted level if the channel is adversely affected by certain temporary severe channel attenuations. Thus, margin provides some insurance under adverse channel conditions.

A higher margin results in a higher level of robustness during changing channel conditions, but at the cost of a lower achievable data rate. Conversely, a lower margin results in a higher achievable data rate, but at the cost of increased vulnerability under changing channel conditions.

In many wireless communication system environments, headroom is used to provide margin. Headroom is the difference between the maximum power of the transmitter and the transmission power level required for a particular data rate. When a mobile station would like to establish a communication channel and has data in its buffer, the mobile station determines its maximum transmission power, subtracts the headroom, and uses the remaining available transmit power to determine a maximum data rate. Thus, the maximum data rate has margin built in to provide some protection against varying channel conditions. To date, headroom has been a constant value established to account for many (but not all) common adverse variances in channel conditions. One common model of adversely varying channel conditions is the Rayleigh fading model.

Although there are occasions where the channel varies more than the Rayleigh fading model predicts, there are many times when channel conditions do not vary as severely as Rayleigh fading. Under more benign channel conditions, such as Rician fading channel conditions, the standard headroom may be excessive. In other words, a transmission through more benign channel conditions would not exceed the maximum bit error rate even if the headroom were lower.

Excessive headroom leads to, among other things, lower achievable data rates and a correspondingly lower battery drain. On the other hand, inadequate headroom leads to a lower level of robustness under changing channel conditions. Thus, there is a desire for transmission power control that reduces instances of excessive headroom to achieve higher data rates while maintaining an acceptable bit error rate over varying channel conditions. The various aspects, features and advantages of the disclosure will become more fully apparent to those having ordinary skill in the art upon careful consideration of the following Drawings and accompanying Detailed Description.

DETAILED DESCRIPTION OF THE PREFERRED EMBODIMENTS

A system, method, and apparatus for establishing headroom for a mobile station operating in a wireless communication system by determining a communication channel variance condition and establishing a headroom value based on the communication channel variance condition. The headroom value may be further revised by determining if a battery condition in a mobile station relates to a low battery level and increasing the headroom value in order to decrease the maximum data rate. Modifications to headroom allow data rates to be tailored to specific channel variance conditions and battery conditions.

Figure 1:
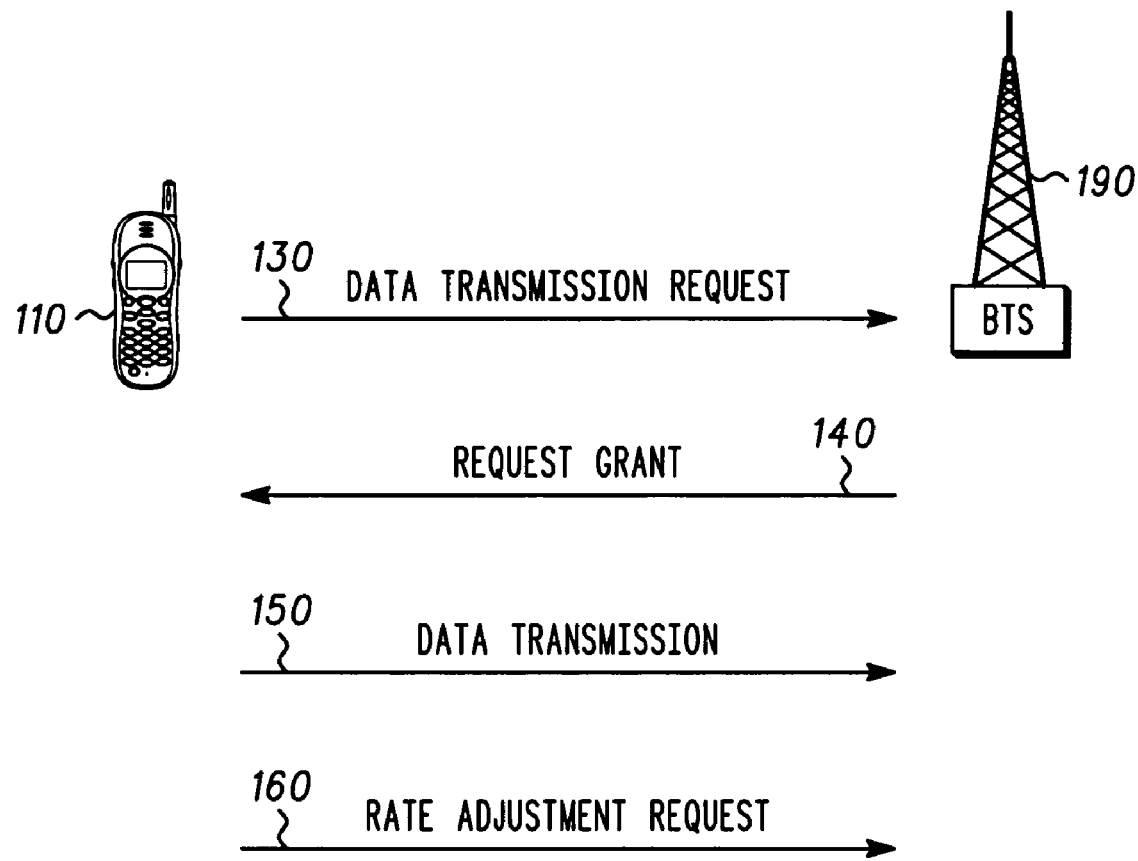
FIG. 1 shows a simplified wireless communication system and sample packet communication transmissions according to a first preferred embodiment.

FIG. 1 shows a simplified wireless communication system 100 and packet communication transmissions according to a first preferred embodiment. This first preferred embodiment depicts a set-up and transmission for a data stream between a mobile station 110 and a base station 190 operating in a CDMA2000 wireless communication system. Other wireless communication systems use similar data transmission set up protocols, and the principles described in this specification could be applied to other wireless communication systems. When the mobile station 110 has data in its buffer to send, the mobile station 110 sends a data transmission request 130 to its serving base station 190. In this first preferred embodiment, the contents of the data transmission request include the mobile station's available transmit power. Preferably, the data transmission request also includes the amount of data in its buffer. Alternate embodiments may include the maximum data rate that the mobile station would like to transmit on the reverse link, and may include related parameters such as the amount of data in its buffer, the rate of its increase, and the headroom value.

After receiving and decoding the data transmission request 130, the base station 190 transmits a request grant 140 to the mobile station 110 that includes: a channel assignment, a data rate assignment for the mobile station or other parameters rated to data rate, and may optionally include a headroom assignment for the mobile station.

Next, the mobile station 110 sends a data transmission 150 to the base station 190 on the assigned channel at the specified data rate. During data transmission 150, the mobile station may detect changes in circumstances that cause it to request a change from the current transmission data rate. If so, the mobile station transmits a rate adjustment request 160. In the first preferred embodiment, the rate adjustment request takes the form of a mobile status indicator bit (MSIB) used in a rate control mode of CDMA2000.

Figure 2:
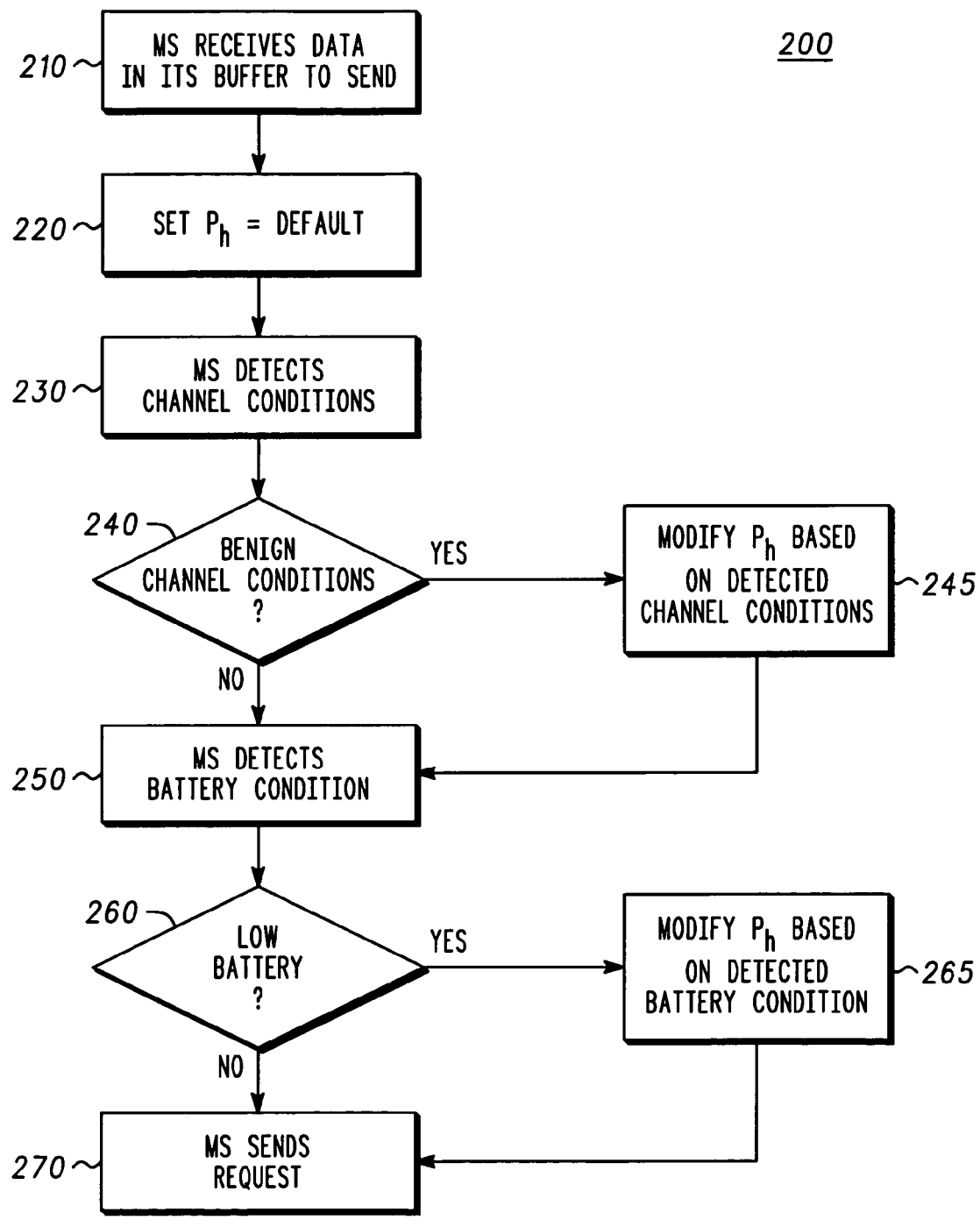
FIG. 2 shows a flow chart used by a mobile station to adjust headroom according to the first preferred embodiment.

FIG. 2 shows a flow chart 200 used by a mobile station to adjust headroom according to the first preferred embodiment. The mobile station 110 shown in FIG. 1 can implement this flow chart 200. In step 210 the mobile station receives data in its buffer to send. At this point, the headroom value ($P_h$) is set to a default value in step 220. In the first preferred embodiment, the default value is the last headroom assignment received from the serving base station. If the serving base station does not provide headroom assignments, the mobile station default would be a predetermined value, such as 5 dB, specified by the network that accounts for most common fading channel conditions.

At step 230, the mobile station detects its communication channel variance conditions. Measurements of primary pilot power variance using a moving window can be used to estimate where the varying channel conditions reside along the spectrum of severe (worse than Rayleigh fading channels) to benign (high K-factor Rician fading channels). Alternate and additional channel measurements include: primary pilot power variance using a variable window size, estimation of the fading period and fade depth, a peak-to-average estimate within an adaptive measurement interval, and other measurements that relate to channel variance.

Step 240 determines whether the actual channel conditions are benign. If channel conditions are benign, the headroom $P_h$ is modified in step 245 based on the detected communication channel variance conditions. Additionally, the duration of the scheduling interval can affect the headroom. For example, scheduling over longer transmission times, which has a higher risk of channel variance, requires higher headroom. Headroom modifications can be implemented using an equation, a look-up chart or matrix, or other known ways to map at least one input to an output. In this first preferred embodiment, the headroom $P_h$ is originally set to the latest headroom assignment from the base station in step 220, and any modifications due to benign channel conditions decrease the value of the headroom $P_h$. It is possible, though, to initialize the headroom value at the highest allowed value such as 5 dB and decrease the headroom based on detected channel conditions. Alternately, the headroom value could be initially set to a middle value with the modifications moving the headroom either up or down depending on detected channel conditions.

Once the headroom is modified, or if the headroom is not modified because channel conditions are not benign, step 250 detects a battery condition of the mobile station. Greater headroom values result in reduced maximum data rates compared to lower headroom values. If, however, the battery is low as determined in step 260, it may be advantageous to increase the headroom $P_h$ in order to force a lower data rate. Because the increased headroom does not affect the range of power control, the quality of the transmitted signal will be adequate, while the mobile station maintains a lower average power and thus produces a power savings. The savings can be used, for example, to extend the duration of a mobile station voice call. Thus, step 265 modifies the headroom value based on the detected battery condition.

After the headroom value has been modified, or if the headroom value is not modified because the battery is not low, step 270 sends a request with the appropriate values. In the first preferred embodiment CDMA2000 system, the request takes the form of either a data transmission request or a rate adjustment request as previously described with reference to FIG. 1. In a data transmission request, the mobile station includes the available transmit power and the amount of the data in its buffer. Some releases of CDMA2000 expect the data transmission request to include the mobile station's maximum data rate rather than its available transmission power and amount of data in its buffer. In that case, the mobile station would subtract the headroom value from its maximum transmit power to result in an available transmit power value. This available transmit power value maps to a maximum data rate which would be included in the data transmission request. Another alternative would be to transmit the maximum transmit power, the headroom, the amount of the data in the buffer, and its rate of increase.

If the request is a rate adjustment request as supported by some modes of operation, such as the CDMA2000 rate control mode, the mobile station calculates a desired transmission rate based on the modified headroom value and other parameters mentioned above, and compares this desired rate to its current transmission rate. If the desired rate is different than the current rate, the mobile station will inform the base station by, for example, transmitting an indicator bit (MSIB) as its rate adjustment request.

Regardless of the information in the request, the mobile station is capable of modifying its headroom under various predetermined conditions, such as benign channel conditions or low battery conditions. Reduction in headroom under benign channel conditions allows higher peak data rates, which promotes improved performance. On the other hand, increasing headroom during lower battery conditions provides lower peak data rates, which extends battery life.

If the mobile station desires to send two or more data streams (or hold voice and data connections at the same time), an addition degree of freedom allows the mobile station to deliberately increase the headroom on one of the data streams to de-prioritize that data stream. This would result in, for example, a longer time to transmit a text message from the mobile station but allow a digital picture to be transmitted at an optimum data rate.

Figure 3:
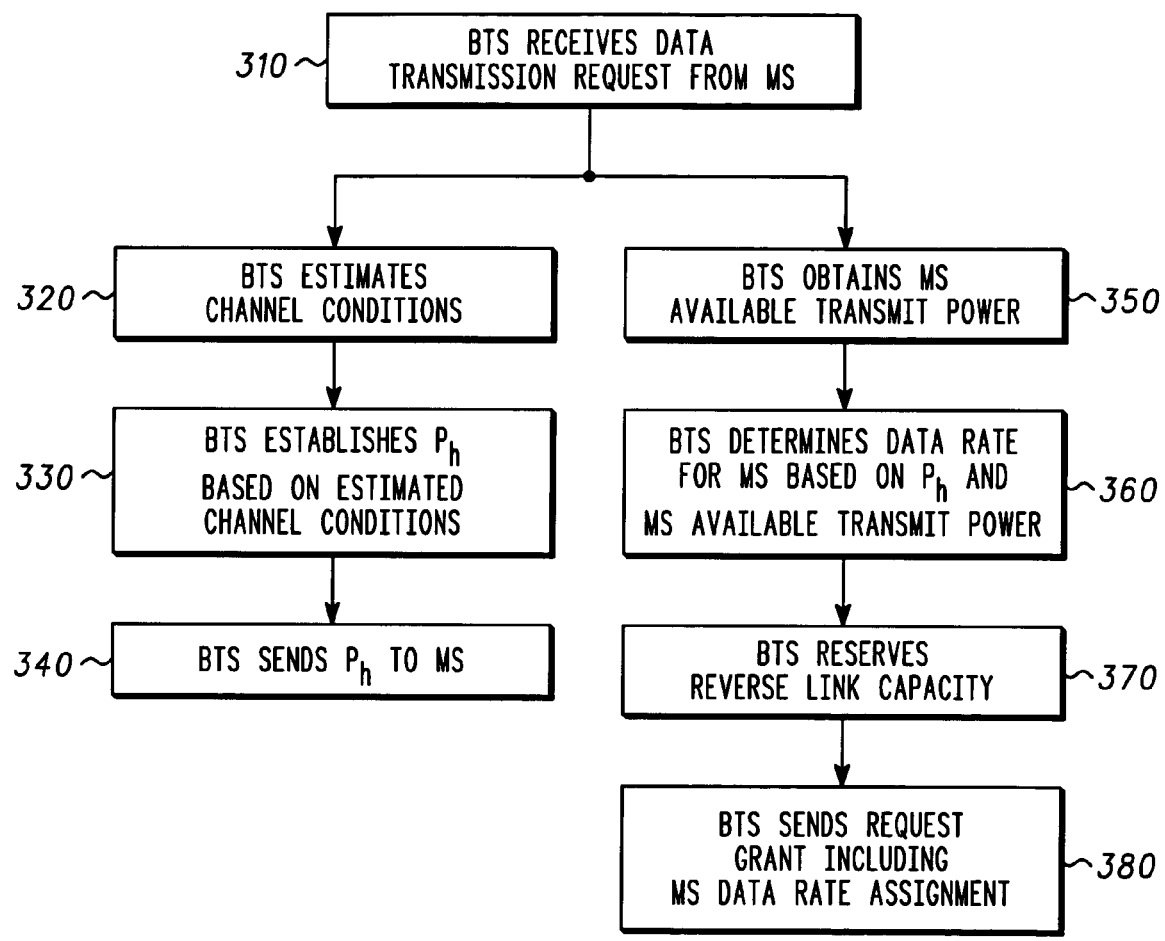
FIG. 3 shows a flow chart used by a base station to assign headroom according to the first preferred embodiment.

The mobile station, or the base station, or both the mobile station and base station can adjust the headroom. FIG. 3 shows a flow chart 300 used by a base station to adjust headroom according to a first preferred embodiment. The base station 190 shown in FIG. 1 can implement this flow chart 300. In step 310, the base station receives a data transmission request from a mobile station, which includes the mobile station's available transmit power and preferably the amount of data in the mobile station's buffer. Optionally, the request can include the amount of data in the mobile station's buffer plus its maximum transmit power and headroom, which can be used to calculate the mobile station's available transmit power. The rate of increase of the amount of data in the mobile station's buffer is also helpful.

In step 320, the base station estimates the communication channel variance conditions. Examination of an inner loop power control bit stream can be used to determine where the varying channel conditions reside along the spectrum including severe (worse than Rayleigh fading channels) and benign (high K-factor Rician fading channels). Other measurements that may affect the determination of channel conditions are measurements from a pilot channel of the mobile station.

Step 330 establishes the headroom of the mobile station based on the estimated communication channel variance conditions. If the channel conditions are benign, the headroom $P_h$ is less than if the channel conditions were severe. Additionally, the duration of the scheduling interval can affect the headroom. For example, longer scheduling intervals produce longer transmission times, which means a higher risk of channel variance, which leads to higher headroom. Headroom can be established using an equation, a look-up chart or matrix, or other known ways to map at least one input to an output. Once the headroom is established, the headroom is sent to the mobile station in step 340. In certain implementations, sending the headroom to the mobile station independently is unsupported or undesirable. Thus, step 340 is optional.

Going to step 350, after the base station receives the data transmission request in step 310, the base station obtains the mobile station's available transmit power either directly or indirectly from information in the request packet. In step 360, the base station determines the data rate for the mobile station based on the headroom (established in step 330) and the mobile station's available transmit power. In step 370, the base station reserves reverse link capacity, and the base station sends a request grant that includes the mobile station data rate assignment in step 380. The request grant can also include the established headroom value.

According to the first preferred embodiment, both the base station and the mobile station participate in headroom adjustments. The base station's request grant 140 (in FIG. 1) assigns the mobile station 110 a data rate based on the headroom determined by the base station 190. The mobile station's headroom determination is used in a rate control mode where the mobile station 190 calculates a desired transmission rate based on the adjustable headroom value and other parameters, and compares this desired rate to its current rate. If the desired rate is larger than the current rate, for example, the mobile station will inform the base station by transmitting an indicator bit (MSIB) in its rate adjustment request 160.

In a second alternative embodiment the mobile station and base station use a slightly different methodology to participate in headroom adjustments. Before the data transmission request 130 (in FIG. 1), the base station 190 has already assigned a headroom value to the mobile station. Thus, setting the headroom value to a default in step 220 (in FIG. 2) is merely setting the headroom value to the latest headroom value assigned by the base station. The base station further updates and refines the headroom value in step 330 (in FIG. 3) and sends that headroom assignment to the mobile station. This loop between the mobile station and the base station can occur outside of the data transmission set up protocol, and the headroom adjustment loop can be applied to other signaling protocols in a wireless communication system.

A third alternate embodiment allows the mobile station to adjust its headroom without the base station's participation. The flow chart 200 (in FIG. 2) enables a mobile station to independently adjust its headroom by setting its headroom value to a standard default value such as 5 dB rather than a value assigned by the base station. Preferably, the standard default value is specified by the network and stored in the mobile station through a layer 3 message during call setup.

In a fourth alternate embodiment, a base station can adjust headroom independently if the mobile station is equipped to accept headroom assignments (not all mobile stations are so equipped).

Thus, the method and apparatus for headroom adjustment provides a margin and related data rate tailored to varying channel conditions, the particular data streams from the mobile station, and the mobile station battery level. This margin more efficiently controls power to promote faster data rates when channel conditions are favorable and increase battery life when the battery level is low.

While this disclosure includes what are considered presently to be the preferred embodiments and best modes of the invention described in a manner that establishes possession thereof by the inventors and that enables those of ordinary skill in the art to make and use the invention, it will be understood and appreciated that there are many equivalents to the preferred embodiments disclosed herein and that modifications and variations may be made without departing from the scope and spirit of the invention, which are to be limited not by the preferred embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

We claim:

1. A method for establishing headroom to provide margin in determining available transmit power value for a mobile station operating in a wireless communication system comprising the steps of:

determining, by the mobile station, a communication channel variance condition, wherein the communication channel variance condition is at least one of a primary pilot power variance, fading period and fade depth estimate, or a peak-to-average estimate within an adaptive measurement interval; and establishing, by the mobile station, a headroom value based on the communication channel variance condition.

2. A method according to claim 1 wherein the mobile station determines a maximum data rate based on the headroom value and sends the maximum data rate to a base station.

3. A method according to claim 1 wherein the mobile station determines a maximum data rate based on the headroom value and sends a rate adjustment request to a base station.

4. A method according to claim 1 further comprising the steps of:

detecting a battery condition of the mobile station; and modifying the headroom value based on the battery condition.

5. A method according to claim 4 wherein the step of modifying the headroom value based on the battery condition comprises:

determining if the battery condition relates to a low battery level; and if the battery condition relates to a low battery level, increasing the headroom value.

6. A method according to claim 1 wherein the step of determining a communication channel variance condition includes measuring a variance in a primary pilot power.

7. A mobile station comprising:

means for determining, by the mobile station, a communication channel variance condition, wherein the communication channel variance condition is at least one of a primary pilot power variance, fading period and fade depth estimate, or a peak-to-average estimate within an adaptive measurement interval; and means for establishing, by the mobile station, a headroom value based on the communication channel variance condition.

8. A mobile station according to claim 7 further comprising:

means for determining a maximum data rate based on the headroom value; and means for sending the maximum data rate to a base station.

9. A mobile station according to claim 7 further comprising:

means for determining a maximum data rate based on the headroom value; and means for sending a rate adjustment request to a base station.

10. A mobile station according to claim 7 further comprising:
   means for detecting a battery condition of the mobile station; and
   means for modifying the headroom value based on the battery condition.

11. A wireless communication system comprising:
   a base station;
   at least one mobile station;
   means for determining, by the at least one mobile station, a communication channel variance condition, wherein the communication channel variance condition is at least one of a primary pilot power variance, fading period and fade depth estimate, or a peak-to-average estimate within an adaptive measurement interval; and
   means for establishing, by the at least one mobile station, a headroom value based on the communication channel variance condition.

12. A wireless communication system according to claim 11 further comprising:
   means for determining a data rate based on the headroom value.

13. A wireless communication system according to claim 12 further comprising:
   means for sending the data rate between the base station and said at least one mobile station.

14. A wireless communication system according to claim 11 further comprising:
   means for determining a battery condition of said at least one mobile station; and
   means for modifying the headroom value based on the battery condition.

15. A wireless communication system according to claim 14 further comprising:
   means for determining a data rate based on the headroom value; and
   means for sending the data rate between said at least one mobile station and the base station.

* * * * *